United States Patent
Inoue et al.

(10) Patent No.: US 7,266,967 B2
(45) Date of Patent: Sep. 11, 2007

(54) AIR CONDITIONER FOR AUTOMOTIVE VEHICLE

(75) Inventors: Satoshi Inoue, Kariya (JP); Shigeji Ooishi, Anjo (JP); Hideaki Satoh, Anjo (JP); Hiroshi Mieda, Kariya (JP)

(73) Assignee: DENSO Corporation, Kariya (JP)

( * ) Notice: Subject to any disclaimer, the term of this patent is extended or adjusted under 35 U.S.C. 154(b) by 309 days.

(21) Appl. No.: 11/049,623

(22) Filed: Feb. 2, 2005

(65) Prior Publication Data

US 2006/0112706 A1 Jun. 1, 2006

(30) Foreign Application Priority Data

Feb. 2, 2004 (JP) .............................. 2004-025566

(51) Int. Cl.
*F25B 27/00* (2006.01)

(52) U.S. Cl. ..................... 62/283.3; 62/101; 62/476
(58) Field of Classification Search .................. 62/101, 62/283.2, 283.3, 239, 323.3, 476
See application file for complete search history.

(56) References Cited

U.S. PATENT DOCUMENTS

| 5,388,423 | A | * | 2/1995 | Khelifa | ..................... 62/238.3 |
| 5,619,866 | A | * | 4/1997 | Sato et al. | .................... 62/480 |
| 5,768,908 | A | * | 6/1998 | Tanaka et al. | ................ 62/332 |
| 6,166,351 | A | | 12/2000 | Yamamoto | |
| 2003/0167925 | A1 | * | 9/2003 | Aikawa et al. | ............... 96/126 |

FOREIGN PATENT DOCUMENTS

| JP | 6-211036 | 8/1994 |
| JP | 11-83235 | 3/1999 |
| JP | 2001-213149 | 8/2001 |

* cited by examiner

*Primary Examiner*—Melvin Jones
(74) *Attorney, Agent, or Firm*—Harness, Dickey & Pierce, PLC

(57) ABSTRACT

An air conditioner for an automotive vehicle having a water-cooling type internal combustion engine includes: a first refrigerator; and an adsorption type refrigerator having adsorbent. The first refrigerator controls temperature of air to be blown into a passenger compartment of the vehicle. The adsorbent generates adsorption heat when the adsorbent adsorbs the medium, and desorbs the adsorbed medium when the adsorbent is heated by coolant water in the internal combustion engine. The air to be blown into the passenger compartment is heated by the adsorption heat of the adsorbent, and is cooled by evaporation latent heat of the medium.

12 Claims, 6 Drawing Sheets

AIR CONDITIONER FOR AUTOMOTIVE VEHICLE

CROSS REFERENCE TO RELATED APPLICATION

This application is based on Japanese Patent Application No. 2004-25566 filed on Feb. 2, 2004, the disclosure of which is incorporated herein by reference.

FIELD OF THE INVENTION

The present invention relates to an air conditioner for an automotive vehicle.

BACKGROUND OF THE INVENTION

An air conditioner for cooling immediately according to a prior art is disclosed in, for example, Japanese Patent Application Publication No. H6-211036. This air conditioner performs to cool immediately by using cooling storage medium. However, in a case where the cooling storage medium is used for the air conditioner, there is a limitation to maintain a cooling performance. Specifically, when the air conditioner is not used for a long time, the temperature of the cooling storage medium exceeds over the melting point thereof. Accordingly, a problem that the cooling performance of the air conditioner deteriorates occurs. Therefore, the air conditioner does not perform to cool a compartment of a passenger compartment preliminary before an internal combustion engine of the vehicle starts (i.e., before a passenger gets in the vehicle, that is for example during the vehicle parking). Thus, this air conditioner is only used for air conditioning in a case of an idle stop mode in which the internal combustion engine of the vehicle is temporarily stopped when the vehicle makes a stop for a signal.

Further, another air conditioner for heating immediately according to a prior art is disclosed in, for example, Japanese Patent Application Publication No. 2000-142084 (which corresponds to U.S. Pat. No. 6,166,351). This air conditioner performs to heat immediately by using an electric heater. However, in a case where the electric heater is used for the air conditioner, the heater is not appropriate for the vehicle having a limited power source, since energy consumption of the heater is large. Specifically, an electric generator is stopped when the internal combustion engine of the vehicle is stopped. Therefore, it is difficult for the air conditioner having large electric consumption to control air in a case of preliminary air conditioning mode or idle stop air conditioning mode.

Furthermore, either air conditioner described above does not perform to heat immediately and to cool immediately by using one system or one medium.

SUMMARY OF THE INVENTION

In view of the above-described problem, it is an object of the present invention to provide an air conditioner for an automotive vehicle capable of cooling and heating a passenger compartment of the vehicle even when an internal combustion engine of the vehicle is stopped.

An air conditioner for an automotive vehicle having a water-cooling type internal combustion engine includes a first refrigerator and an adsorption type refrigerator having adsorbent for adsorbing and desorbing medium. The first refrigerator controls the temperature of air to be blown into a passenger compartment of the vehicle. The adsorbent generates adsorption heat when the adsorbent adsorbed the medium. Further, the adsorbent desorbs the adsorbed medium when the adsorbent is heated by coolant water in the internal combustion engine. The air to be blown into the passenger compartment is heated by the adsorption heat, which is generated by the adsorbent. Further, the air is cooled by evaporation latent heat.

In the above conditioner, the air to be conditioned is heated by the adsorption heat generated in the adsorbent, and is cooled by using the evaporation latent heat of the medium. Therefore, the adsorption type air conditioner can perform both of cooling and heating. Further, since the adsorption type refrigerator operates with small energy consumption, the adsorption type refrigerator can be operated even when the internal combustion engine is stopped. Accordingly, the adsorption refrigerator can cool and heat the passenger compartment even when the internal combustion engine is stopped.

Preferably, the adsorption type refrigerator further includes: an adsorption heat exchanger for exchanging heat between the coolant water and the adsorbent; an adsorbent container for accommodating the adsorbent and the adsorption heat exchanger; an evaporation and condensation heat exchanger for exchange heat between the medium and heat exchange fluid for cooling the air to be blown into the passenger compartment; a medium storage tank disposed on a place higher than the adsorbent container in the vertical direction for storing the liquid phase medium and for accommodating the evaporation and condensation heat exchanger, wherein the liquid phase medium is condensed and cooled by the evaporation and condensation heat exchanger; a gas phase medium passage for connecting between the adsorbent container and the medium storage tank and for flowing the gas phase medium therethrough; a first valve disposed in the gas phase medium passage for opening and closing the gas phase medium passage; a liquid phase medium passage for connecting between the adsorbent container and the medium storage tank and for flowing the liquid phase medium therethrough; and a second valve disposed in the liquid phase medium passage for opening and closing the liquid phase medium passage.

In this case, when the air conditioner cools the compartment, the first valve is opened so that the gas phase medium in the medium storage tank is adsorbed on the adsorbent in the adsorbent container. Further, the liquid phase medium in the medium storage tank is evaporated for cooling the air to be conditioned by using the evaporation latent heat of the medium. On the other hand, when the air conditioner heats the compartment, the second valve is opened so that the liquid phase medium in the medium storage tank flows into the adsorbent container. Thus, the liquid phase medium is adsorbed on the adsorbent. The air to be conditioned is heated by using the adsorption heat generated in a case where the medium is adsorbed. Accordingly, the adsorption type refrigerator can perform both of cooling and heating. Further, the refrigerator is operated with small energy consumption; and therefore, the adsorption type refrigerator can operate even when the internal combustion engine is stopped. Accordingly, the adsorption type refrigerator can cool and heat the passenger compartment even when the internal combustion engine is stopped. Further, since the pressure of the gas phase medium becomes smaller in winter season, the gas phase medium is not adsorbed on the adsorbent easily. However, in this air conditioner, the liquid phase medium is adsorbed on the adsorbent; and therefore, the medium is appropriately adsorbed on the adsorbent so that the adsorption heat is generated sufficiently.

Preferably, when the first refrigerator is operated so that cooling load is high, the first valve is closed. Thus, since the adsorbent is not refreshed when the cooling load is high, whole cooling performance of the first refrigerator is used for cooling the passenger compartment. Accordingly, the cooling performance for cooling the passenger compartment is not reduced. Here, the reduction of the cooling performance may be occurred if the gas phase medium is condensed in the evaporation and condensation heat exchanger by using a part of the cooling performance of the first refrigerator when the adsorbent is refreshed.

Preferably, the first refrigerator is a vapor compression type refrigerator. Further, the first valve is closed when the first refrigerator is operated, and the cooling performance is low. Accordingly, whole cooling performance of the first refrigerator is used for cooling the passenger compartment since the adsorbent is not refreshed in a case where the cooling performance is low. When a compressor in the vapor compression type refrigerator is operated with a low speed rotation, the cooling performance becomes smaller. Therefore, the reduction of the cooling performance may be occurred if the adsorbent is refreshed by using a part of the cooling performance. In the present invention, the cooling performance is not reduced since adsorbent is not refreshed.

Preferably, the evaporation and condensation heat exchanger has a performance for evaporating and condensing the medium by the heat exchange between the heat exchange fluid and the medium. More preferably, the adsorbent container and the medium storage tank are almost in vacuum, respectively.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
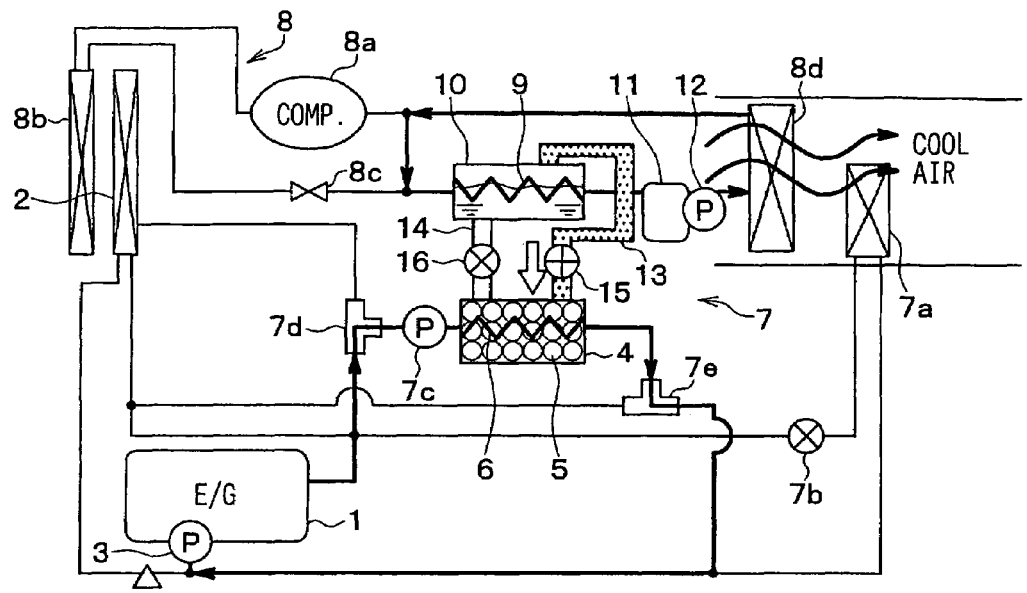
FIG. 1 is a schematic view showing an air conditioner for an automotive vehicle according to a first embodiment of the present invention.

An air conditioner for an automotive vehicle according to a first embodiment of the present invention is shown in FIG. 1. In FIG. 1, an internal combustion engine 1 generates a driving force to drive the vehicle. The engine 1 is a water-cooling type internal combustion engine to be cooled with coolant water. A radiator 2 cools the coolant water by exchanging heat between the coolant water after passing through the internal combustion engine 1 and air (i.e., outside air outside the air conditioner). The first water pump 3 obtains a driving force from the internal combustion engine 1 so that the pump 3 circulates the coolant water. The radiator 2 has a construction with one inlet and two outlets so that the radiator 2 can make two different temperatures.

An adsorbent container 4 accommodates an adsorption heat exchanger 6, on a surface of which adsorbent 5 is adhered. The inside of the adsorbent container 4 is almost in vacuum. Here, the adsorbent 5 generates heat when the evaporated medium is adsorbed on the adsorbent 5. In this embodiment, the medium is made of water, and the medium is sealed into the adsorbent container 4 with a predetermined amount. Further, the adsorbent 5 is made of water absorbing material such as silica gel or zeolite. Further, the adsorbent 5 generates adsorption heat almost corresponding to heat of condensation in the medium (i.e., condensation heat plus α) when the adsorbent 5 adsorbs the medium. Further, the adsorbent 5 has a hysteresis characteristic such that the amount of the medium capable of being adsorbed in the adsorbent 5 is different in accordance with the temperature hysteresis even when the relative temperature of the adsorbent 5 is the same.

The coolant water for cooling the internal combustion engine 1 flows in the inside of the adsorption heat exchanger 6. The adsorption heat exchanger 6 exchanges heat between the coolant water and the adsorbent 5. When the temperature of the coolant water flowing through the inside of the adsorption heat exchanger 6 is higher than that of the adsorbent 5, waste heat energy of the internal combustion engine 1 transmits to the adsorbent 5 (i.e., the adsorbent 5 is heated). When the temperature of the coolant water flowing through the inside is lower than that of the adsorbent 5, the adsorbent 5 is cooled.

A heater core 7a exchanges heat between the air to be conditioned and to be blown into the passenger compartment and the coolant water. A circuit for circulating the coolant water through the heater core 7a is opened and closed by a warm water valve 7b. The second water pump 7c circulates the coolant water through the adsorption heat exchanger 6, and is operated by an electric motor.

The first three-way valve 7d switches between a case where the coolant water discharged from the radiator 2 introduces into the adsorption heat exchanger 6 and another case where the coolant water discharged from the internal combustion engine 1 introduces into the adsorption heat exchanger 6.

The second three-way valve 7e switches between a case where the coolant water discharged from the adsorption heat exchanger 6 introduces into the internal combustion engine 1 or the heater core 7a and another case where the coolant water discharged from the adsorption heat exchanger 6 introduces into the radiator 2.

The vapor compression type refrigerator 8 is conventionally composed of a compressor 8a, a condenser 8b, an expansion device 8c, an evaporator 8d and the like. The compressor 8a is energized from the internal combustion engine 1 through an electromagnetic clutch so that the compressor 8 sucks and pressurizes the refrigerant (e.g., fluorocarbon). The evaporator 8d exchanges heat between the refrigerant and the air to be conditioned so that the evaporator 8d cools the air to be conditioned. Here, the vapor compression type refrigerator 8 corresponds to the first refrigerator in the present invention.

In a refrigerant circuit of the vapor compression type refrigerator 8, an evaporation and condensation heat exchanger 9 is formed between the expansion device 8c and the evaporator 8d. The refrigerant used in the vapor compression type refrigerator 8 passes through the inside of the evaporation and condensation heat exchanger 9. The evaporation and condensation heat exchanger 9 is accommodated in a medium storage tank 10, which connects to the adsorbent container 4. The evaporation and condensation heat exchanger 9 exchanges heat between the medium stored in the medium storage tank 10 and the refrigerant passing through the inside of the evaporation and condensation heat exchanger 9. The refrigerant passing through the inside of the evaporation and condensation heat exchanger 9 corresponds to a heat exchange fluid in the present invention. Further, the inside of the medium storage tank 10 is almost in vacuum.

In the refrigerant circuit of the vapor compression type refrigerator 8, a refrigerant tank 11 and a refrigerant pump 12 are formed between the evaporation and condensation heat exchanger 9 and the evaporator 8d. The refrigerant tank 11 stores the liquid phase refrigerant, and the refrigerant pump 12 circulates the liquid refrigerant through the evaporator 8d by being driven by the electric motor.

The evaporation and condensation heat exchanger 9 and the medium storage tank 10 are disposed above the adsorbent container 4 in an up and down direction (i.e., a vertical direction). A gas phase medium passage 13 and a liquid phase medium passage 14 connect between the medium storage tank 10 and the adsorbent container 4.

The gas phase medium passage 13 connects between the upside of the medium storage tank 10 and the adsorbent container 4 so that a gas phase medium (i.e., a vapor) flows through the gas phase medium passage 13. The first valve 15 opens and closes the gas phase medium passage 13. The liquid phase medium passage 14 connects between the bottom of the medium storage tank 10 and the adsorbent container 4 so that a liquid phase medium (i.e., a liquid) flows through the liquid phase medium passage 14. The second valve 16 opens and closes the liquid phase medium passage 14.

The adsorption type refrigerator 7 is composed of the adsorbent container 4, the adsorbent 5, the adsorption heat exchanger 6, the heater core 7a, the warm water valve 7b, the second water pump 7c, the first three-way valve 7d, the second three-way valve 7e, the evaporation and condensation heat exchanger 9, the medium storage tank 10, the gas phase medium passage 13, the liquid phase medium passage 14, the first valve 15, the second valve 16 and the like.

The warm water valve 7b, the second water pump 7c, the first three-way valve 7d, the second three-way valve 7e, the refrigerant pump 12, the first valve 15, the second valve 16, the electromagnetic clutch and the like are controlled by an electric control unit for the air conditioner (i.e., ECU, Electric Control Unit). A signal concerning an air conditioning sensors such as an inside air temperature sensor and an outside air temperature sensor is inputted into the ECU, and further, another signal concerning an idle stop mode outputted from an engine control unit of the internal combustion engine 1 is inputted into the ECU.

Next, an operation of the air conditioner according to the first embodiment is described as follows. Here, in FIGS. 1 to 7, which explain different operational modes, a part of the coolant water circuit and a part of the refrigerant circuit, each part of which flows the coolant water or the refrigerant flows, are shown as thick lines and arrows.

1. Immediate Cooling and Immediate Heating Mode (See FIG. 1)

This mode is performed in a case where the temperature of the coolant water discharged from the internal combustion engine 1 is low in summer season. Specifically, the mode is performed before a warm-up of the internal combustion engine 1 is not finished.

Specifically, the first valve 15 is opened so that the medium storage tank 10 and the adsorbent container 4 are connected each other through the gas phase medium passage 13. Further, the refrigerant pump 12 is operated so that the refrigerant is circulated between the evaporation and condensation heat exchanger 9 and the evaporator 8d.

Thus, the vapor evaporates by absorbing heat from the refrigerant at the evaporation and condensation heat exchanger 9, and then, the vapor is introduced into the adsorbent container 4. The introduced vapor is adsorbed on the adsorbent 5. At this time, the refrigerant is cooled by evaporation latent heat, and then, the cooled refrigerant is circulated to the evaporator 8d so that the air to be conditioned and to be blown into the passenger compartment is cooled.

Accordingly, the passenger compartment can be cooled even when the internal combustion engine 1 is stopped, for example, in an idle stop mode. Further, a preliminary air conditioning can be performed in such a manner that this mode is performed by a remote control operation or a clock-timer operation before a passenger gets into the vehicle (i.e., during the vehicle is parking). On the other hand, the vapor compression type refrigerator 8 is operated together with the absorption type refrigerator 7 so that the passenger compartment is cooled rapidly when the internal combustion engine 1 runs.

Further, in this mode, the second water pump 7c is operated so that the coolant water is circulated between the adsorption heat exchanger 6 and the internal combustion engine 1. Thus, the coolant water flowing through the inside of the adsorption heat exchanger 6 is heated by adsorption heat generated in a case where the adsorbent 5 adsorbs the vapor. Then, the coolant water is returned to the internal combustion engine 1. Accordingly, the internal combustion engine 1 warms up.

2. Adsorbent Refreshing Mode in Summer Season (See FIG. 2)

This mode is performed in a case where the internal combustion engine 1 runs in a summer season so that the temperature of the coolant water discharged from the internal combustion engine 1 is high.

Specifically, the passenger compartment is cooled by operating the vapor compression type refrigerator 8. At the same time, the first valve 15 is opened so that the medium storage tank 10 and the adsorbent container 4 are connected each other through the gas phase medium passage 13. Further, the second water pump 7c is operated so that the high temperature coolant water discharged from the internal combustion engine 1 is circulated into the adsorption heat exchanger 6.

Thus, the adsorbent 5 is heated by the high temperature coolant water flowing through the adsorption heat exchanger 6. Then, the medium adsorbed on the adsorbent 5 is removed and desorbed from the adsorbent 5 as a vapor. The desorbed vapor is introduced into the medium storage tank 10 through the gas phase medium passage 13, and the vapor is cooled by the refrigerant flowing through the evaporation and condensation heat exchanger 9 so that the vapor is condensed. Then, the condensed vapor as a fluid is stored in the medium storage tank 10.

3. Immediate Heating Mode (See FIG. 3)

This mode is performed in a case where the temperature of the coolant water discharged from the internal combustion engine 1 is low in winter season.

Specifically, the second valve 16 is opened so that the medium storage tank 10 and the adsorbent container 4 are connected each other through the liquid phase medium passage 14. Further, the second water pump 7c is operated together with opening the warm water valve 7b so that the coolant water is circulated between the adsorption heat exchanger 6 and the heater core 7a.

Thus, the fluid in the medium storage tank 10 is introduced into the adsorbent container 4, and the introduced fluid is adsorbed on the adsorbent 5. The coolant water flowing through the adsorption heat exchanger 6 is heated by the adsorption heat at this time. The heated coolant water is circulated to the heater core 7a so that the air to be conditioned and to be blown into the passenger compartment is heated.

Here, the vapor is not adsorbed on the adsorbent 5 easily since the vapor pressure is low in winter season. However, since the adsorbent 5 adsorbs the fluid in this mode, the adsorbent 5 appropriately adsorbs the fluid so that the adsorption heat is obtained sufficiently.

4. Adsorbent Refreshing Mode in Winter Season (See FIG. 4)

This mode is performed in a case where the internal combustion engine 1 runs so that the temperature of the coolant water discharged from the internal combustion engine 1 is high in winter season.

Specifically, the first water pump 3 is operated so that the high temperature coolant water discharged from the internal combustion engine 1 is circulated into the heater core 7a. Thus, the inside of the passenger compartment is heated.

At the same time, the first valve 15 is opened so that the medium storage tank 10 and the adsorbent container 4 are connected each other through the gas phase medium passage 13. Further, the second water pump 7c is operated so that high temperature coolant water discharged from the internal combustion engine 1 is circulated into the adsorption heat exchanger 6. Furthermore, the refrigerant pump 12 is operated so that the refrigerant is circulated between the evaporation and condensation heat exchanger 9 and the evaporator 8d.

Thus, the adsorbent 5 is heated by the high temperature coolant water flowing through the adsorption heat exchanger 6. Then, the medium adsorbed on the adsorbent 5 is removed and desorbed from the adsorbent 5 as a vapor. The desorbed vapor is introduced into the medium storage tank 10 through the gas phase medium passage 13, and the vapor is cooled by the refrigerant flowing through the evaporation and condensation heat exchanger 9 so that the vapor is condensed. Then, the condensed vapor as a fluid is stored in the medium storage tank 10. The heated refrigerant heated by the heat of condensation is introduced into the evaporator 8d so that the refrigerant is used for heating the compartment.

5. Idle Stop Mode in Summer Season (See FIG. 5)

This mode is performed in a case where the temperature of the coolant water discharged from the internal combustion engine 1 is high at the idle stop operation in summer season.

Specifically, the first valve 15 is opened so that the medium storage tank 10 and the adsorbent container 4 are connected each other through the gas phase medium passage 13. Further, the refrigerant pump 12 is operated so that the refrigerant is circulated between the evaporation and condensation heat exchanger 9 and the evaporator 8d. Furthermore, the second water pump 7c is operated so that the coolant water is circulated between the adsorption heat exchanger 6 and the radiator 2.

Thus, the vapor evaporates by absorbing heat from the refrigerant at the evaporation and condensation heat exchanger 9, and then, the vapor is introduced into the adsorbent container 4. The introduced vapor is adsorbed on the adsorbent 5. At this time, the refrigerant is cooled by evaporation latent heat, and then, the cooled refrigerant is circulated to the evaporator 8d so that the air to be conditioned and to be blown into the passenger compartment is cooled.

Further, the adsorption heat generated in a case where the adsorbent 5 adsorbs the vapor is absorbed in the coolant water flowing through the adsorption heat exchanger 6. Then, the adsorption heat is radiated from the radiator 2.

6. Adsorbent Refreshing Mode After Internal Combustion Engine Stops (See FIG. 6)

This mode is performed in a case where an ignition switch is turned off so that the internal combustion engine 1 is stopped.

Specifically, the first valve 15 is opened so that the medium storage tank 10 and the adsorbent container 4 are connected each other through the gas phase medium passage 13. Further, the second water pump 7c is operated so that the coolant water is circulated between the internal combustion engine 1 and the adsorption heat exchanger 6. Furthermore, the refrigerant pump 12 is operated so that the refrigerant is circulated between the evaporation and condensation heat exchanger 9 and the evaporator 8d.

Thus, the adsorbent 5 is heated by the high temperature coolant water flowing through the adsorption heat exchanger 6. Then, the medium adsorbed on the adsorbent 5 is removed and desorbed from the adsorbent 5 as a vapor. The desorbed vapor is introduced into the medium storage tank 10 through the gas phase medium passage 13, and the vapor is cooled by the refrigerant flowing through the evaporation and condensation heat exchanger 9 so that the vapor is condensed. Then, the condensed vapor as a fluid is stored in the medium storage tank 10. The adsorption heat generated in a case where the adsorbent 5 adsorbs the vapor is absorbed in the refrigerant flowing through the evaporation and condensation heat exchanger 9, and then, the adsorption heat is radiated from the evaporator 8d.

7. Parking Mode (See FIG. 7)

This mode is performed after "the adsorbent refreshing mode after the internal combustion engine stops" is finished. During the vehicle is parked, the first valve 15 and the second valve 16 are closed, respectively, so that no vapor is supplied to the adsorbent 5. Thus, cooling storage condition or heat storage condition is maintained.

In the above described embodiment, the air to be conditioned is heated by the adsorption heat generated by the adsorbent 5. Further, the air to be conditioned is cooled by using the evaporation latent heat of the medium. Therefore, the adsorption type refrigerator 7 can perform both of cooling and heating the compartment. Further, since the adsorbent type refrigerator 7 is operated with small energy consumption, the adsorbent type refrigerator 7 can be operated even when the internal combustion engine 1 is stopped. Accordingly, the adsorbent type refrigerator 7 can cool or heat the passenger compartment even when the internal combustion engine 1 is stopped.

Furthermore, since the pressure of the gas phase medium becomes smaller in winter season, the gas phase medium is not adsorbed on the adsorbent easily. However, in this embodiment, the liquid phase medium is adsorbed on the adsorbent; and therefore, the medium is appropriately adsorbed on the adsorbent so that the adsorption heat is obtained sufficiently.

Second Embodiment

Figure 8:
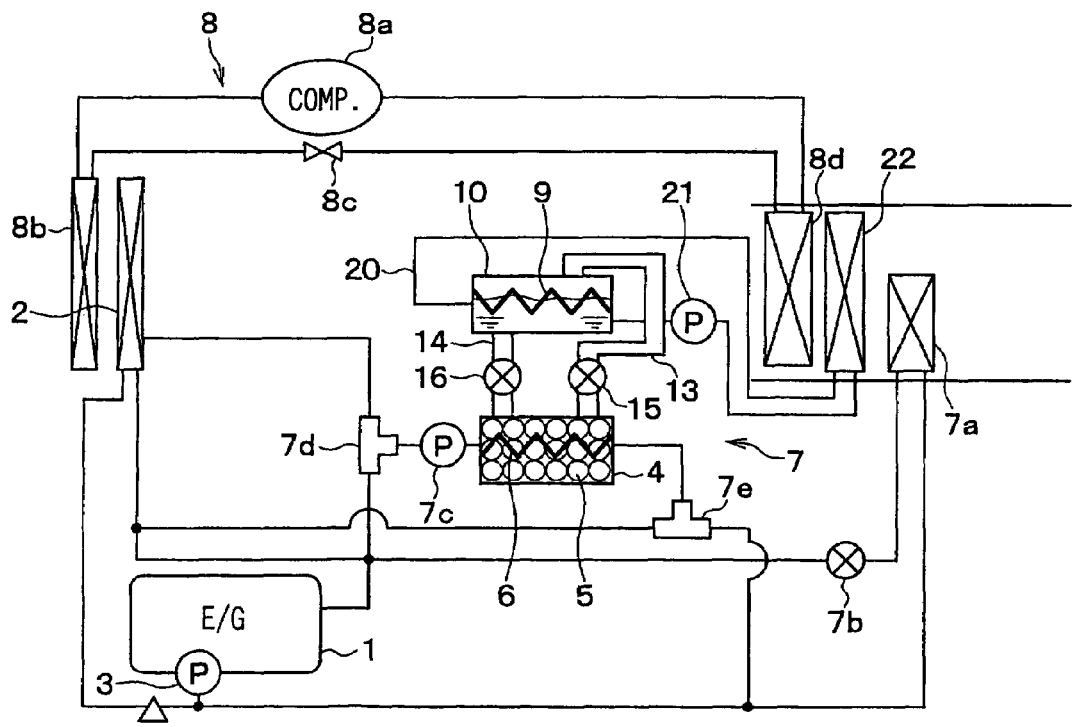
FIG. 8 is a schematic view showing an air conditioner for an automotive vehicle according to a second embodiment of the present invention.

An air conditioner for an automotive vehicle according to a second embodiment of the present invention is shown in FIG. 8. In the air conditioner, the adsorption type refrigerator 7 and the vapor compression type refrigerator 8 are separated. Specifically, in the conditioner according to the first embodiment, the evaporation and condensation heat exchanger 9 in the adsorption type refrigerator 7 is disposed in the refrigerant circuit of the vapor compression type refrigerator 8 so that the refrigerant in the vapor compression type refrigerator 8 flows through the evaporation and condensation heat exchanger 9. However, in this embodiment, as shown in FIG. 8, the evaporation and condensation heat exchanger 9 is disposed in a heat exchange fluid circuit 20, which is separated from the refrigerant circuit of the vapor compression refrigerator 8, so that the fluid flows through the heat exchange fluid circuit 20 and the evaporation and condensation heat exchanger 9.

Further, the third water pump 21 and an interior heat exchanger 22 are disposed in the heat exchange fluid circuit 20. The third water pump 21 circulates fluid. The interior heat exchanger 22 exchanges heat between the fluid and the air to be conditioned. Therefore, the interior heat exchanger 22 is disposed behind the evaporator 8d (i.e., a downstream side of airflow). Here, the fluid flowing through the heat exchange fluid circuit 20 according to the second embodiment corresponds to heat exchange fluid in the present invention.

In the second embodiment, coolness generated in the evaporation and condensation heat exchanger 9 is transmitted to the interior heat exchanger 22 with the fluid (i.e., the heat exchange fluid), and then, the passenger compartment is cooled by the heat exchange between the fluid and the air to be conditioned. Further, the condensation heat is generated in the evaporation and condensation heat exchanger 9 when the adsorbent 5 is refreshed. The condensation heat is transmitted to the interior heat exchanger 22 similarly, and then, the condensation heat is radiated to the air after passing through the evaporator 8d. When the adsorbent 5 is refreshed, the compressor 8a is operated. Therefore, the sufficient cooling performance is obtained from the vapor compression type refrigerator 8.

Third Embodiment

Figure 9:
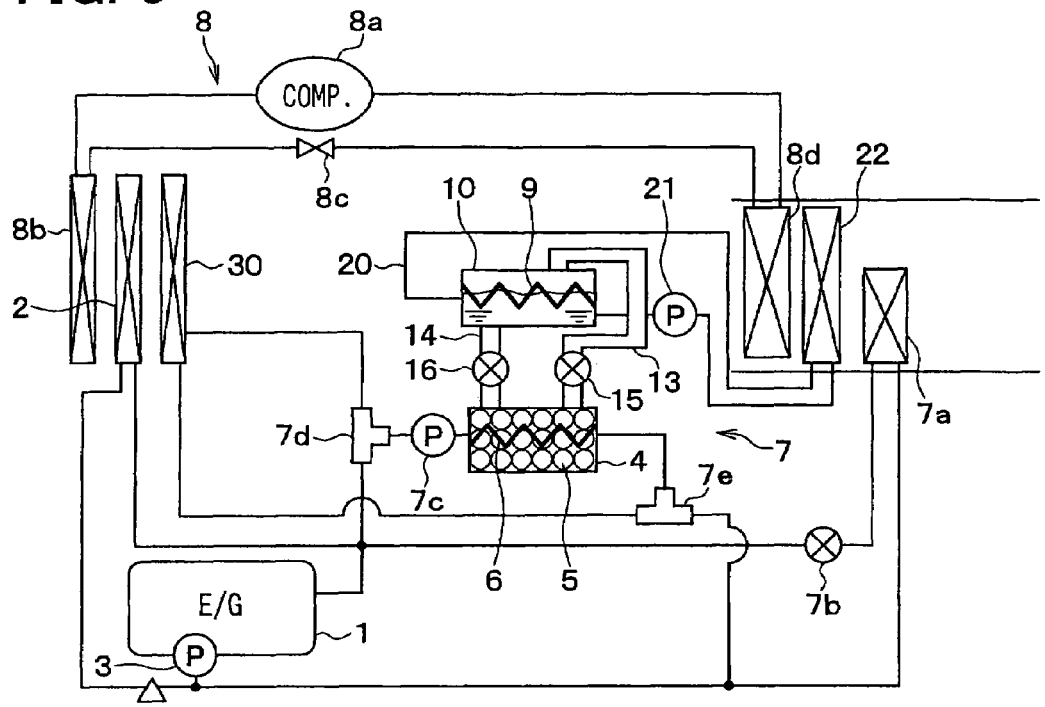
FIG. 9 is a schematic view showing an air conditioner for an automotive vehicle according to a third embodiment of the present invention.

An air conditioner for an automotive vehicle according to a third embodiment of the present invention is shown in FIG. 9. As shown in FIG. 9, the air conditioner includes an exterior heat exchanger 30, which is different from the air conditioner shown in FIG. 8. The exterior heat exchanger 30 exchanges heat between the coolant water after passing through the adsorption heat exchanger 6 and the outside air outside the air conditioner. Further, the radiator 2 exchanges heat between the coolant water after cooling the internal combustion engine 1 and the outside air.

Fourth Embodiment

Figure 10:
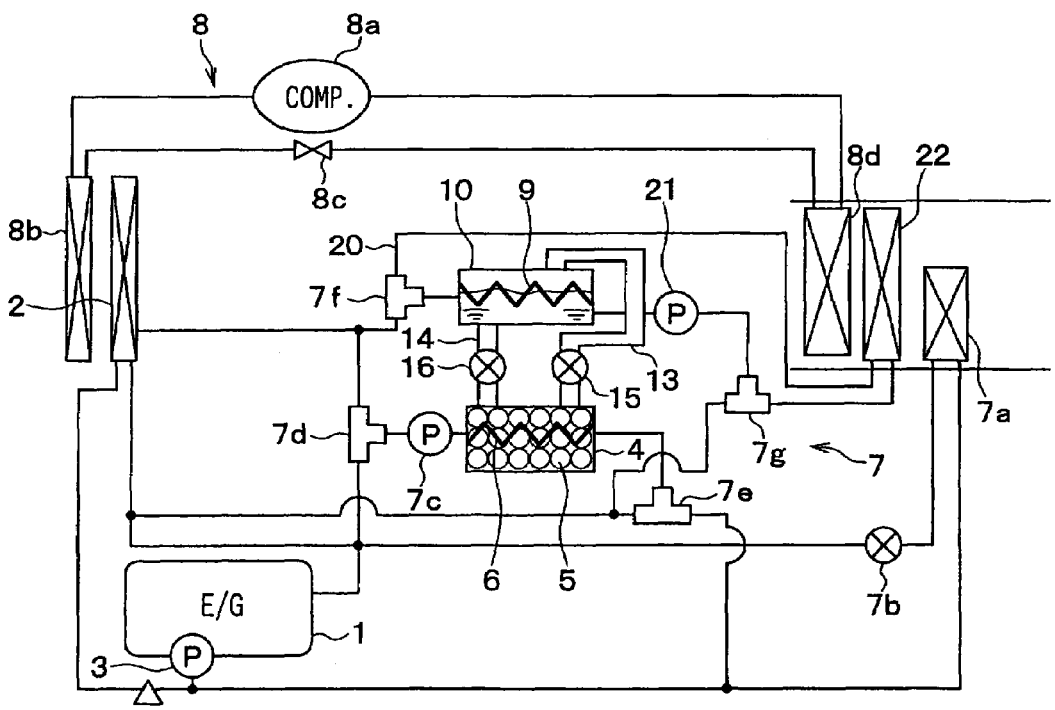
FIG. 10 is a schematic view showing an air conditioner for an automotive vehicle according to a fourth embodiment of the present invention.

An air conditioner for an automotive vehicle according to a fourth embodiment of the present invention is shown in FIG. 10. As shown in FIG. 10, the air conditioner is different from the air conditioner shown in FIG. 8. In the air conditioner, the heat exchange fluid circuit 20 is connected to the coolant water circuit, and further, the air conditioner includes the third three-way valve $7f$ and the fourth three-way valve $7g$ disposed at a connection portion between the heat exchange fluid circuit and the coolant water circuit.

The first three-way valve $7d$ switches between a case where the coolant water discharged from the radiator 2 is introduced into the adsorption heat exchanger 6 and a case where the coolant water discharged from the internal combustion engine 1 is introduced into the adsorption heat exchanger 6.

The second three-way valve $7e$ switches between a case where the coolant water discharged from the adsorption heat exchanger 6 is introduced into the internal combustion engine 1 or the heater core $7a$ and a case where the coolant water discharged from the adsorption heat exchanger 6 is introduced into the radiator 2.

In the air conditioner shown in FIG. 1, the condensation heat generated at "the adsorbent refreshing mode in summer season" is radiated to the passenger compartment. However, in the air conditioner according to the second embodiment, the coolant water is not introduced into the interior heat exchanger 22. Instead, all of the coolant water is introduced into the radiator 2 by using the third three-way valve $7f$ and the fourth three-way valve $7g$. Thus, the condensation heat can be radiated to the outside air at the radiator 2. If the radiation to the outside of the air conditioner is difficult to perform since the outside temperature is high, the condensation heat can be radiated to the passenger compartment similar to the air conditioner shown in FIG. 1.

Fifth Embodiment

Figure 11:
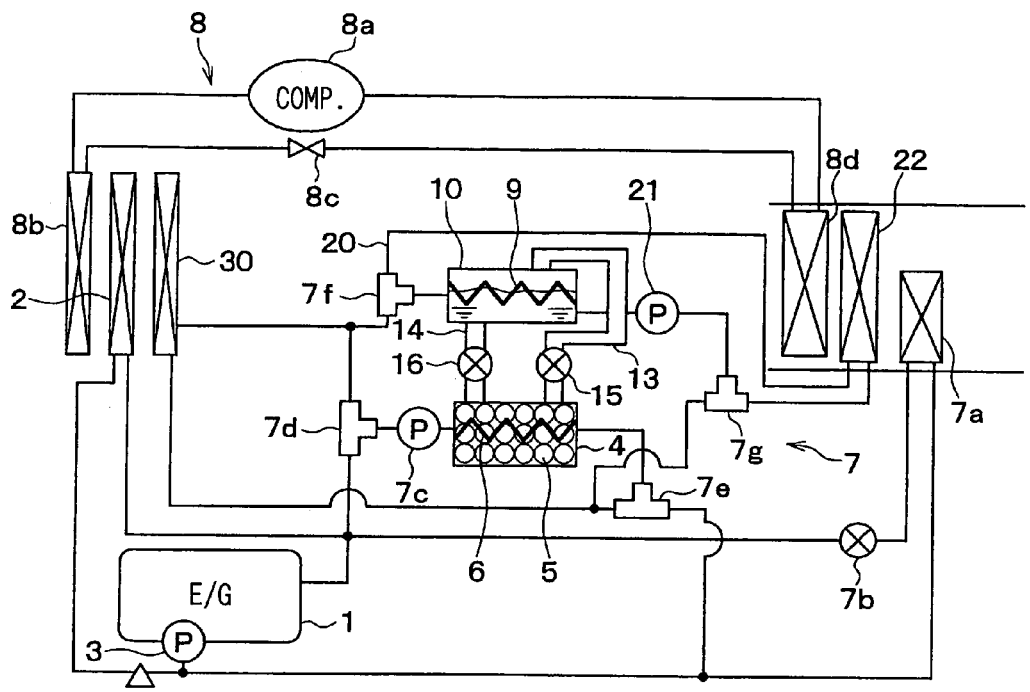
FIG. 11 is a schematic view showing an air conditioner for an automotive vehicle according to a fifth embodiment of the present invention.

An air conditioner for an automotive vehicle according to a fifth embodiment of the present invention is shown in FIG. 11. As shown in FIG. 10, the air conditioner according to the fifth embodiment includes the exterior heat exchanger 30, which is different from the air conditioner shown in FIG. 10. The exterior heat exchanger 30 exchanges heat between the coolant water after passing through the adsorption heat exchanger 6 and the outside air. Further, the radiator 2 exchanges heat between the coolant water after cooling the internal combustion engine 1 and the outside air.

Sixth Embodiment

Figure 12:
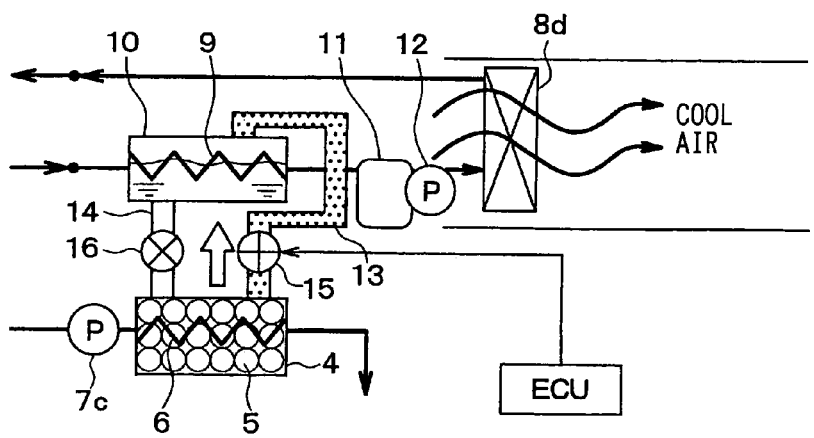
FIG. 12 is a schematic view showing an air conditioner for an automotive vehicle according to a sixth embodiment of the present invention.

An air conditioner for an automotive vehicle according to a sixth embodiment of the present invention is shown in FIG. 12.

The air conditioner according to the sixth embodiment further includes a control means for opening and closing the first valve 15 in accordance with an operating condition of the air conditioner and a vehicle speed condition.

Figure 2:
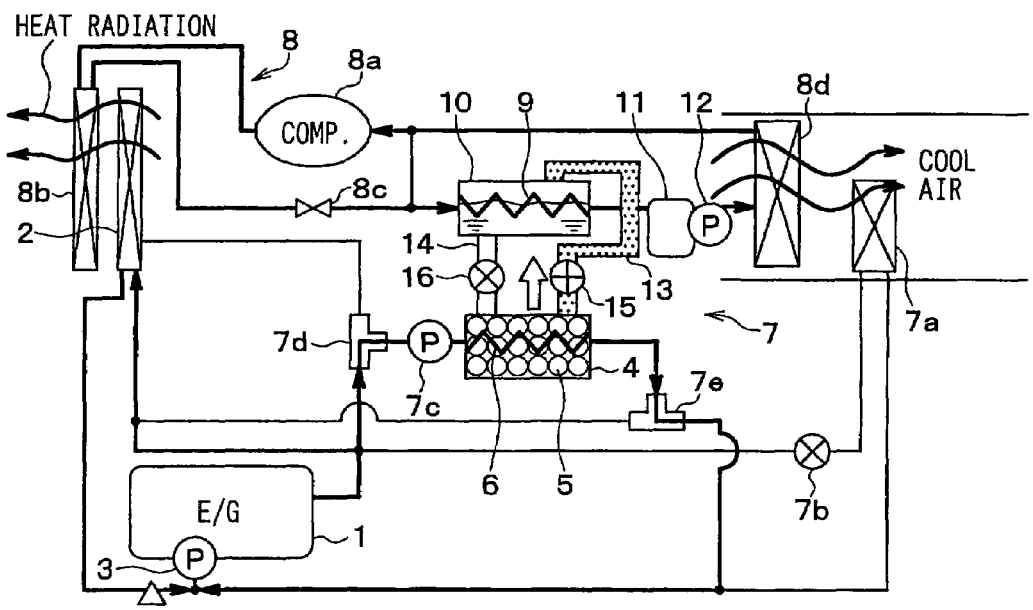
FIG. 2 is a schematic view explaining an adsorbent refreshing mode in the air conditioner in summer season, according to the first embodiment.
Figure 3:
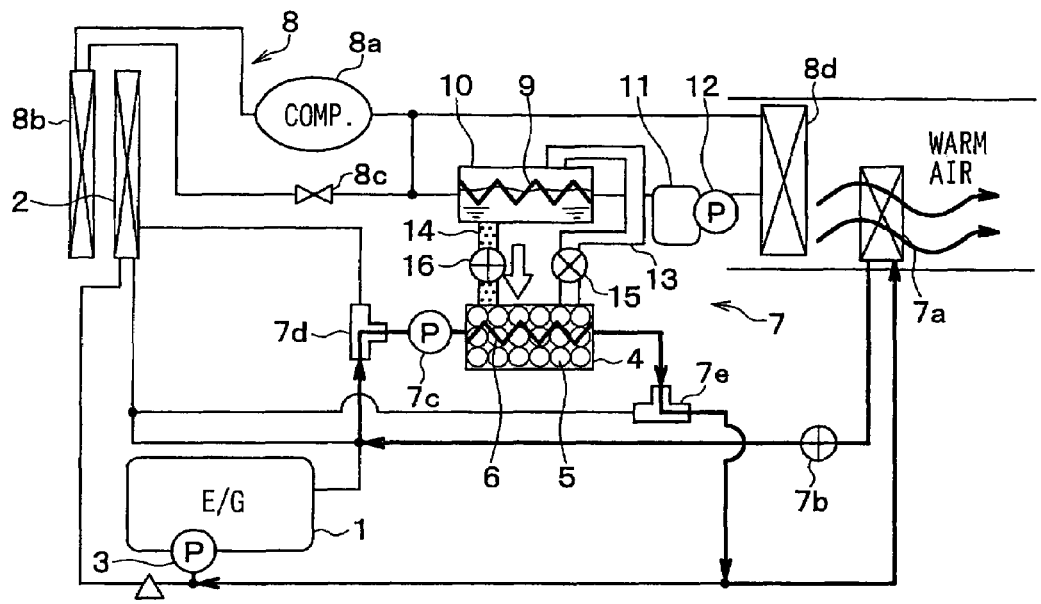
FIG. 3 is a schematic view explaining an immediate heating mode in the air conditioner according to the first embodiment.
Figure 4:
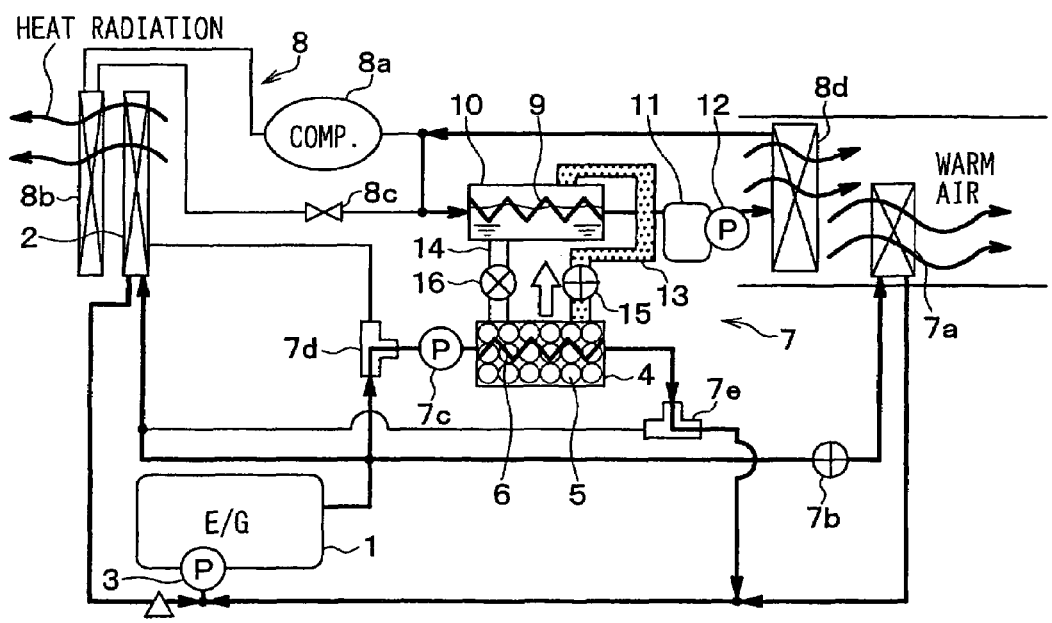
FIG. 4 is a schematic view explaining an adsorbent refreshing mode in the air conditioner in winter season, according to the first embodiment.

In the air conditioner shown in FIG. 2, in "the adsorbent refreshing mode in summer season (See FIG. 2)", the vapor is condensed in the evaporation and condensation heat exchanger 9 by using a part of the cooling performance of the vapor compression type refrigerator 8. Therefore, the cooling performance for cooling the passenger compartment as a primary function is reduced. Thus, the temperature of the air to be blown into the compartment may be reduced, and therefore, the passenger may feel discomfort.

To avoid the reduction of the cooling performance, when the high cooling performance is required in a case where the air conditioner starts to cool the compartment or a case where the temperature of the outside air is high, the first valve 15 is closed to stop refreshing the adsorbent 5 so that the vapor is not condensed in the evaporation and condensation heat exchanger 9. Thus, whole cooling performance of the vapor compression type refrigerator 8 can be used for cooling the passenger compartment.

In this case, for example, a target blowing temperature (i.e., TAO), which is a control signal of an automatic control air conditioner, can be used for controlling the first valve 15 in such a manner that the first valve 15 is closed when the TAO becomes smaller than a predetermined temperature. Further, when the compressor 8a is composed of a variable capacitance type compressor, a signal concerning the capacitance of the compressor can be used. Specifically, when the capacitance of the compressor becomes maximum, it is determined that the high cooling performance is required. Thus, the first valve 15 is controlled to close.

Figure 5:
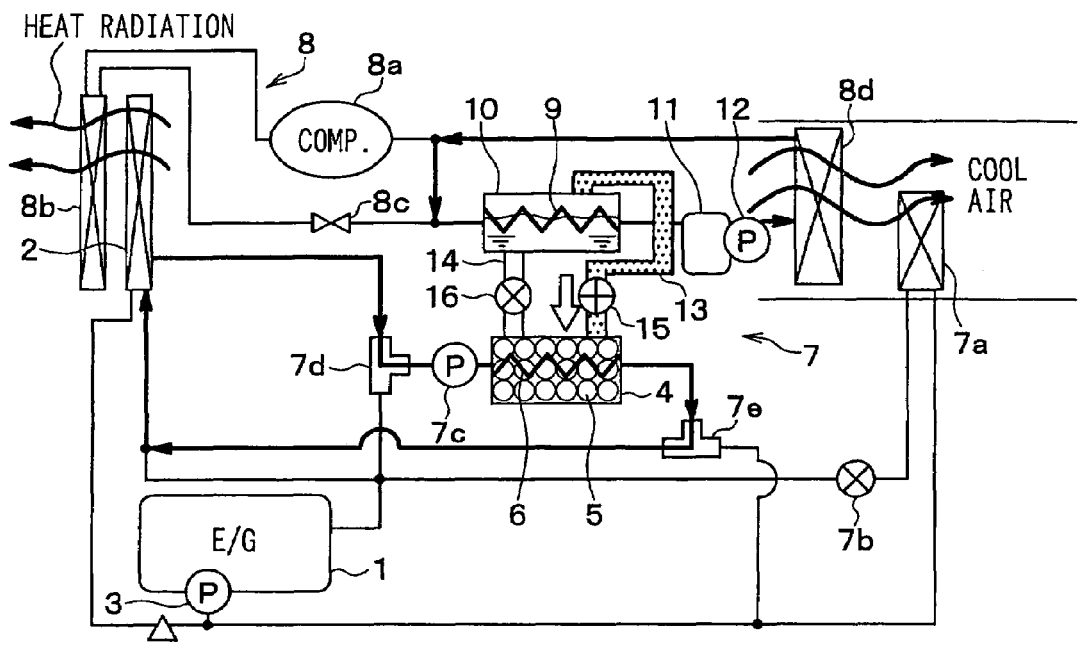
FIG. 5 is a schematic view explaining an idle stop mode in the air conditioner in summer season, according to the first embodiment.
Figure 6:
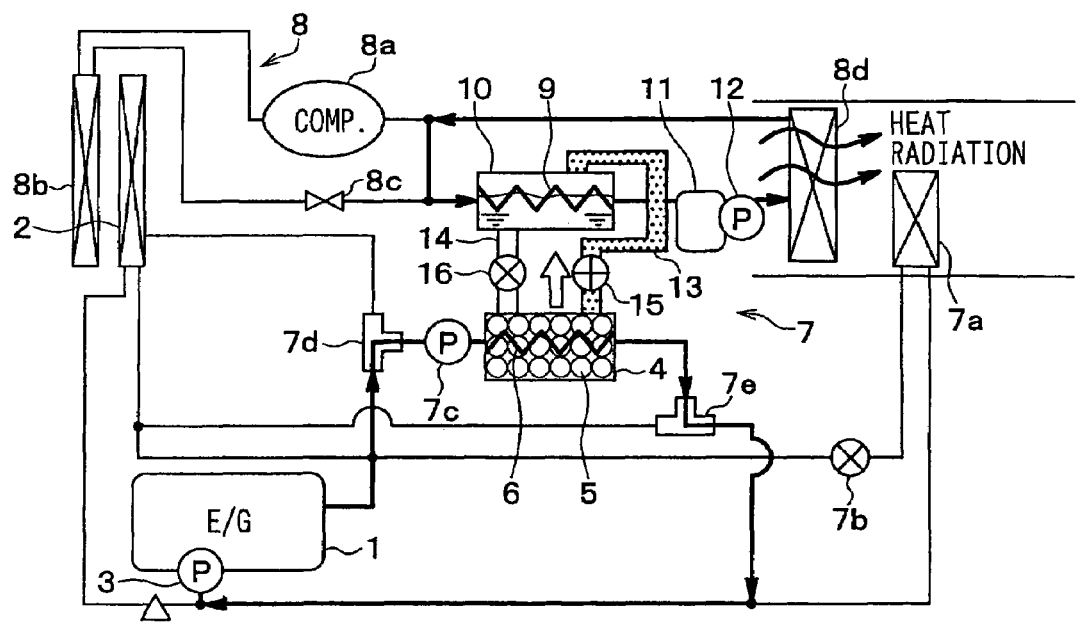
FIG. 6 is a schematic view explaining an adsorbent refreshing mode in the air conditioner after an internal combustion engine is stopped, according to the first embodiment.
Figure 7:
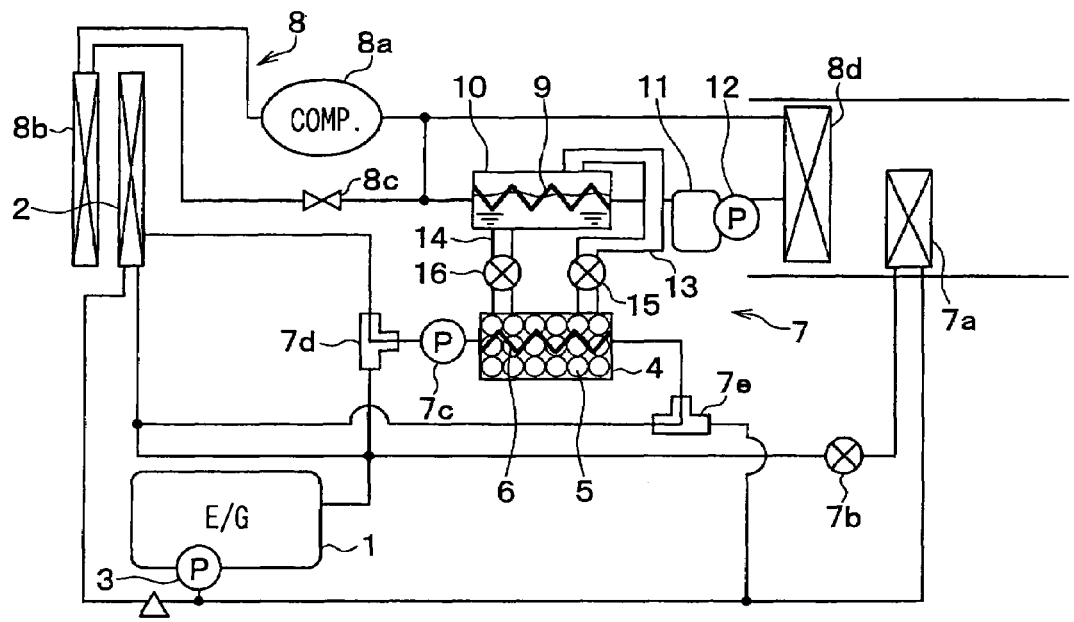
FIG. 7 is a schematic view explaining a parking mode in the air conditioner according to the first embodiment.

Further, in "the idle stop mode in summer season" (See FIG. 5) of the air conditioner shown in FIG. 5, when the vehicle stops for a long time so that cooling storage amount is used up, the blowing temperature is increased. Therefore, the internal combustion engine 1 is operated again so that the compressor 8a is operated, and then, the vapor compression type refrigerator 8 is operated to cool the compartment.

In this case, since the compressor 8a is operated in a low speed rotation region at the engine idling, the cooling performance becomes smaller. Therefore, if a part of the cooling performance of the vapor compression type refrigerator 8 is used for refreshing the adsorbent 5, the blowing temperature may be increased. Thus, it is not preferable for the air conditioner to cool sufficiently. Accordingly, the first valve 15 is controlled to close so that the adsorbent 5 is not refreshed in the idle stop mode in a case where it is determined on the basis of a vehicle speed signal or the like that the vehicle stops.

Such changes and modifications are to be understood as being within the scope of the present invention as defined by the appended claims.

What is claimed is:

1. An air conditioner for an automotive vehicle having a water-cooling type internal combustion engine, the conditioner comprising:
   a first refrigerator;
   an adsorption type refrigerator having adsorbent for adsorbing and discharging medium;
   an adsorption heat exchanger for exchanging heat between coolant water from the internal combustion engine and the adsorbent;
   an adsorbent container for accommodating the adsorbent and the adsorption heat exchanger;
   an evaporation and condensation heat exchanger for exchange heat between the medium and heat exchange fluid to cool air to be blown into a passenger compartment of the vehicle;
   a medium storage tank disposed on a predetermined place higher than the adsorbent container in a vertical direction for storing a liquid phase medium and for accommodating the evaporation and condensation heat exchanger, wherein the liquid phase medium is condensed and cooled by the evaporation and condensation heat exchanger;
   a gas phase medium passage for connecting between the adsorbent container and the medium storage tank and for flowing the gas phase medium therethrough;
   a first valve disposed in the gas phase medium passage for opening and closing the gas phase medium passage;
   a liquid phase medium passage for connecting between the adsorbent container and the medium storage tank and for flowing the liquid phase medium therethrough; and
   a second valve disposed in the liquid phase medium passage for opening and closing the liquid phase medium; wherein
   the first refrigerator controls a temperature of the air to be blown into the passenger compartment of the vehicle,
   the adsorbent generates adsorption heat when the adsorbent adsorbs the medium, and desorbs the adsorbed medium when the adsorbent is heated by the coolant water from the internal combustion engine, and
   the air to be blown into the passenger compartment is heated by the adsorption heat, which is generated by the adsorbent, and is cooled by evaporation latent heat when the medium is desorbed from the adsorbent.

2. The air conditioner according to claim 1, wherein
   the heat exchange fluid is refrigerant in the first refrigerator, and
   the evaporation and condensation heat exchanger is connected to the first refrigerator so that the refrigerant of the first refrigerator flows in the evaporation and condensation heat exchanger.

3. The air conditioner according to claim 1, further comprising:
   an evaporator for exchanging heat between the refrigerant of the first refrigerator and the air to be blown into the passenger compartment; and
   an interior heat exchanger for exchanging heat between the air to be blown into the passenger compartment and the heat exchange fluid after passing through the evaporation and condensation heat exchanger.

4. The air conditioner according to claim 1, further comprising:
   a radiator for exchanging heat between the coolant water after passing through the internal combustion engine and outside air outside the air conditioner; and
   an exterior heat exchanger for exchanging heat between the coolant water after passing through the adsorption heat exchanger and the outside air.

5. The air conditioner according to claim 1, further comprising:
   a radiator for exchanging heat between the coolant water after passing through the internal combustion engine and outside air outside the air conditioner; and
   an interior heat exchanger, wherein
   the heat exchange fluid is the coolant water of the internal combustion engine, the radiator exchanges heat between the coolant water after passing through the evaporation and condensation heat exchanger and the outside air, the interior heat exchanger exchanges heat between the air to be blown into the passenger compartment and the coolant water after passing through the evaporation and condensation heat exchanger, and the coolant water after passing through the evaporation and condensation heat exchanger flows into the radiator or the interior heat exchanger.

6. The air conditioner according to claim 1, further comprising:

an interior heat exchanger; and an exterior heat exchanger, wherein the heat exchange fluid is the coolant water of the internal combustion engine, the interior heat exchanger exchanges heat between the air to be blown into the passenger compartment and the coolant water after passing through the evaporation and condensation heat exchanger, the exterior heat exchanger exchanges heat between the coolant water after passing through the evaporation and condensation heat exchanger and outside air outside the air conditioner, and the coolant water after passing through the evaporation and condensation heat exchanger flows into the interior heat exchanger or the exterior heat exchanger.

7. The air conditioner according to claim 1, wherein the first valve is closed when the first refrigerator is operated and cooling load is high.

8. The air conditioner according to claim 1, wherein the first refrigerator is a vapor compression type refrigerator, and the first valve is closed when the first refrigerator is operated, and the cooling performance is low.

9. The air conditioner according to claim 1, wherein the evaporation and condensation heat exchanger has a performance for evaporating and condensing the medium by the heat exchange between the heat exchange fluid and the medium.

10. The air conditioner according to claim 1, wherein the adsorbent container and the medium storage tank are almost in vacuum, respectively.

11. The air conditioner according to claim 1, wherein the adsorbent is capable of adsorbing the medium in liquid phase so that the adsorption heat is generated, and the air to be blown into the passenger compartment is rapidly heated by the adsorption heat.

12. The air conditioner according to claim 11, wherein the medium in liquid phase is introduced into the adsorbent container from the medium storage tank when the second valve is opened.

* * * * *